United States Patent
Moudgill

(10) Patent No.: US 8,407,456 B2
(45) Date of Patent: Mar. 26, 2013

(54) METHOD AND INSTRUCTION SET INCLUDING REGISTER SHIFTS AND ROTATES FOR DATA PROCESSING

(75) Inventor: Mayan Moudgill, White Plains, NY (US)

(73) Assignee: Qualcomm Incorporated, San Diego, CA (US)

( * ) Notice: Subject to any disclaimer, the term of this patent is extended or adjusted under 35 U.S.C. 154(b) by 475 days.

(21) Appl. No.: 12/375,203

(22) PCT Filed: Dec. 4, 2008

(86) PCT No.: PCT/US2008/085539
§ 371 (c)(1),
(2), (4) Date: Jan. 26, 2009

(87) PCT Pub. No.: WO2009/073787
PCT Pub. Date: Jun. 11, 2009

(65) Prior Publication Data
US 2010/0228938 A1    Sep. 9, 2010

Related U.S. Application Data

(60) Provisional application No. 60/992,479, filed on Dec. 5, 2007.

(51) Int. Cl.
*G06F 9/315* (2006.01)
(52) U.S. Cl. ........................................ 712/223
(58) Field of Classification Search .......... None
See application file for complete search history.

(56) References Cited

U.S. PATENT DOCUMENTS

| | | | |
|---|---|---|---|
| 5,751,614 A * | 5/1998 | Cohen | 708/231 |
| 5,991,531 A | 11/1999 | Song et al. | |
| 6,088,782 A * | 7/2000 | Lee et al. | 712/4 |
| 6,304,956 B1 * | 10/2001 | Tran | 712/221 |
| 7,610,472 B2 * | 10/2009 | Jeong et al. | 712/223 |
| 2005/0108312 A1 * | 5/2005 | Chen et al. | 708/513 |
| 2005/0125641 A1 | 6/2005 | Ford et al. | |
| 2005/0204117 A1 * | 9/2005 | Carpenter et al. | 712/224 |
| 2005/0283773 A1 | 12/2005 | Eichenberger et al. | |

OTHER PUBLICATIONS

IPRP dated Jun. 17, 2010 in PCT/US08/085539.
International Search Report for International Application No. PCT/US2008/085539, dated Jan. 29, 2009.

* cited by examiner

*Primary Examiner* — Jacob A Petranek
(74) *Attorney, Agent, or Firm* — Knobbe Martens Olson & Bear, LLP

(57) ABSTRACT

A method includes identifying a first register with M bits and a second register with N bits. The process also includes shifting K bits, where K<=N, from the second register into the first register. The shifting operation executes a left shift operation including reading bits K . . . N−1 from the first register, writing bits K . . . N−1 into bit positions O . . . N−K−1 of the first register, reading K bits from the second register, and writing K bits from second register into bit positions N−K . . . N−1 of first register, or a right shift operation including reading bits O . . . N−K−1 from the first register, writing bits O . . . N−K−1 into bit position K . . . N−1 of the first register, reading the K bits from the second register, and writing K bits from second register into bit positions O . . . K−1 of first register.

24 Claims, 12 Drawing Sheets

METHOD AND INSTRUCTION SET INCLUDING REGISTER SHIFTS AND ROTATES FOR DATA PROCESSING

CROSS-REFERENCE TO RELATED APPLICATIONS

This application is a newly-filed application that does not rely for priority on any other application for priority.

FIELD OF THE INVENTION

This invention relates to a method and an instruction set that includes register shifts and rotates for a processor. More specifically, the invention relates to a method and an instruction set for a Single Instruction, Multiple Data Digital Signal Processor ("SIMD DSP").

Certain key digital signal processing algorithms, such as filtering, require a mechanism that will allow all elements of an array to be "streamed" past elements of another array. The invention provides techniques to do this efficiently on a processor, such as a SIMD DSP, by using a register file that allows register elements to be shifted and/or rotated.

DESCRIPTION OF RELATED ART

As should be appreciated by those skilled in the art, SIMD processors are used for a variety of different applications. Among them, SIMD processors are employed for graphics processing. Of course, SIMD processors may be used for a wide variety of data processing algorithms and functions and is not limited solely to graphics processing.

To those skilled in the art, many Digital Signal Processing ("DSP") algorithms are known that have implementations similar to Code Segment 1, below:

```
Code Segment 1 for( i = 0; i < M; i++ ) {
  sum = 0;
  for( j = 0; j < N; j++ ) {
    sum += a[i+j] * b[j];
  }
  z[i] = sum;
}
```

The instruction set in Code Segment 1 provides a code for a filter. As should be appreciated by those skilled in the art, with minor modifications, this code segment may be used to implement correlations or convolutions. When executed on a Digital Signal Processor ("DSP"), all operations employing Code Segment 1 typically will be saturating.

As also should be understood by those skilled in the art, a Single Instruction, Multiple Data ("SIMD") processor with a reduction unit typically includes an instruction whose behavior may be described according to Code Segment 2, which is provided below:

```
Code Segment 2 for( j = 0; j < L; j++ ) {
  ac0 += v0[i] * v3[j];
}
```

In Code Segment 2, v0 and v3 are SIMD registers that hold L elements of an array. The variable ac0 is an accumulator register that stores the result of the operation. In Code Segment 2, the accumulator stores 16-bit values. Of course, as should be appreciated by those skilled in the art, the accumulator alternatively may store 32-bit values. The saturating variant of this instruction is labeled "rmulreds".

As should be appreciated by those skilled in the art, it is possible to implement the inner loop of the filter efficiently using the rmulreds instruction. For most filters, N is generally less than forty-eight. Accordingly, the inner loop typically will need at most three rmulreds instructions. (NOTE: For sixteen-bit values, 3×16=48.) Of course, with three rmulreds instructions, the performance of the filter starts to be dominated by a requirement to initialize the accumulator and to save the final accumulated result.

To illustrate this phenomenon, an example where N=16 is considered. Using pseudo assembler language, an instruction set may be generated that is the same as or equivalent to Code Segment 3, provided below:

```
Code Segment 3 load      v3,&b[0]     # loads b[0]... b[15] into SIMD v0;
                             # done once per filter
L0:
      set       ac0 := 0     # sum = 0
      load      v0,&a[j]     # loads a[j+0]..a[j+15] into SIMD v0
      rmulreds  ac0,v0,v3    # the entire inner loop
      store     ac0,&z[j]    # z[j] := 16 bits of ac0
      loop      j,M,L0       # do this M times
```

As incorporated in Code Segment 3, the rmulreds instruction is responsible for processing the entire inner loop of the filter in one instruction. It is noted, however, that a single iteration of the outer loop requires five instructions, which are also detailed in Code Segment 3.

For Code Segment 3, five instructions are needed for the outer loop because of the overhead involved to set up the accumulator, load the registers, and provide control for the operation(s). Depending on the amount of parallelism available in the processor, instead of executing sixteen multiply-and-add functions each and every cycle, the sustained performance of a filter might be lower and, in some cases, much lower. Parallelism, therefore, presents at least one opportunity for optimization of the execution of the code segment or algorithm.

The load of values for "a" into v0 provides another opportunity for optimization. As can be seen, v0 contains a[j+0], a[j+1], ..., a[j+15] in one iteration. In a subsequent iteration, a[j+1], ..., a[j+15], a[j+16] are loaded. As should be appreciated by those skilled in the art, many, if not most, of these elements are the same. At least for this reason, therefore, an interest has developed for development of a mechanism that permits reuse of the common elements within or between iterations.

As should be immediately apparent, reuse of common elements, among other things, reduces the power consumption by the device executing the instruction set. At least for this reason, therefore, a need has developed at least for algorithms designed to reuse common elements.

In general, reduction of the power consumption of a device executing a particular instruction set, algorithm, or code segment, is at least one consideration for code designers and also for engineers of the devices on which the code(s) are executed.

SUMMARY OF THE INVENTION

It is, therefore, at least one feature of the invention to improve performance of algorithms by reducing overhead burdens on the processing of those algorithms.

It is still another feature of the invention to improve performance filters (one type of algorithm) by reducing the overhead of instructions required for execution of those performance filters.

In one embodiment of the invention, the operation of performance filters is enhanced by adding the ability to do shifts to the SIMD file.

A further feature of the invention, among others, includes reducing the number of loads, operational or otherwise, placed on a particular algorithm.

Still another feature of the invention includes a variant of the same ability, where rotating register pairs allows for a reduction in the number of loads placed on an algorithm by allowing reuse of common elements between iterations.

One further feature of the invention provides for reuse of common elements, among other things, to reduce the power consumption by the device executing the instruction set.

Still further features of the invention will be made apparent from the description of the invention and the drawings that follow.

DESCRIPTION OF THE DRAWINGS

The invention is discussed in connection with the drawings, where like reference numbers are employed to refer to like elements, in which.

DETAILED DESCRIPTION OF EMBODIMENT(S) OF THE INVENTION

Figure 1:
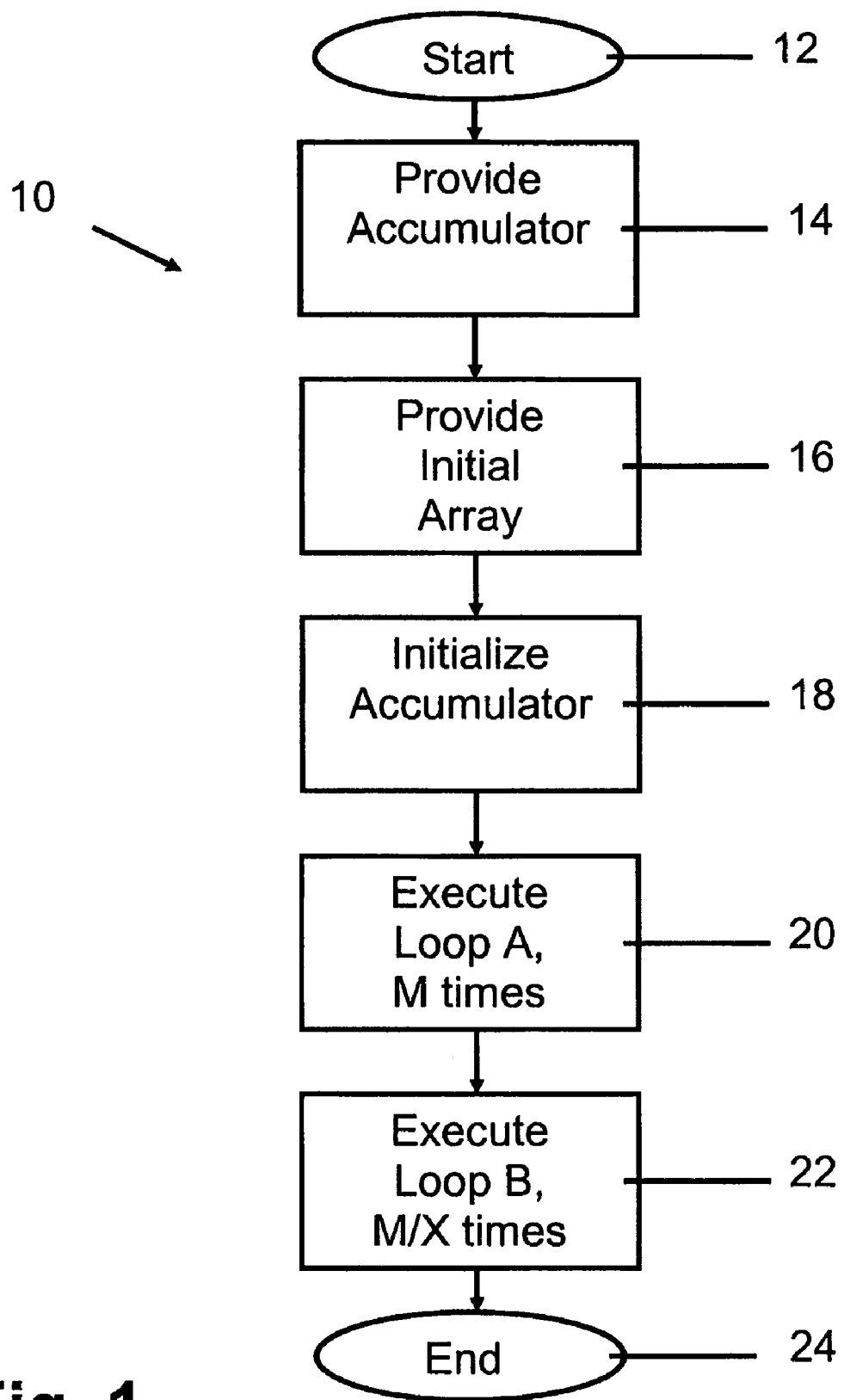
FIG. 1 is a flow diagram illustrating one embodiment of the invention.

As will become apparent from the description that follows, there are a number of techniques that may be employed to assist with data processing in a processor, including a SIMD DSP. The invention incorporates aspects of techniques referred to as "shifting," "rotating," and a combination of shifting and rotating to assist with signal processing. One result of the application of these techniques is to generate arrays of data that may be reused during processing, thereby reducing the total processing time for that data. When processing time is reduced, overall power consumption by the device executing the particular instruction set is realized, among other benefits, as should be appreciated by those skilled in the art.

As will be apparent from the discussion that follows, the generation of modified data arrays permits an instruction set to process multiple streams of data with a reduced requirement to initialize the accumulator associated with operation of the instruction set. Other benefits of such processing are also provided by the techniques incorporated in the invention, as should be appreciated by those skilled in the art.

I. Shift

Shifting of data elements within an array to generate a new, shifted array assists with data processing. Once the new data array is created, the two arrays may "pass" one another in the processor (i.e., they may be processed separately without interfering with one another during processing.

An array of values typically includes a two- or three-dimensional matrix that contains data elements or operators. The data structure that contains the array of values also may be referred to as a "register" in some contexts within the relevant art. A register comprises multiple elements, each of which typically contains data or operators. As should be appreciated by those skilled in the art, in complex data environments, an element in a register may itself be a separate register.

A shift is an operation where an element-wise shift of the elements is made in a register to the left or to the right by some number of elements. A shift may be performed in a SIMD register, thereby resulting in an element-wise shift of the elements within the SIMD register.

The most basic shift of elements is where elements are moved by one array location either to the left or to the right. Of course, as mentioned above, shifting may be a greater number of array locations or elements. It is contemplated that shifts of two or more array locations may be made. Therefore, a shift by any number of array locations greater than one is intended to be encompassed by the invention.

A left-shift by one element may be expressed as set forth in Code Segment 4, below:

Code Segment 4

```
for( j = 0; j < L-1; j++ ) {
    v4[j] = v4[j+1];
}
```

Similarly, a right shift by one element may be expressed as set forth in Code Segment 5, below:

Code Segment 5

```
for( j = L-1; j >= 0; j-- ) {
    v5[j+1] = v5[j];
}
```

In either the case of the left-shift operation or the right-shift operation, the last element and the first element are undefined. Since they are undefined, a truncated form of the accumulator may be moved into these first and last elements.

With this in mind, for a saturating algorithm with a 16-bit result, the upper 16 bits of the accumulator are of particular interest. Thus, a SIMD-register shift instruction, rshift, may be written as set forth below in Code Segment 6:

| Code Segment 6 |
| --- |
| for( j = 0; j < 15; j++ ) {<br>   v4[j] = v4[j+1];<br>}<br>v4[15] = ac0>>16; |

A variant of the rshift instruction, rshift0, additionally may be used to clear the accumulator. Using the rshift0 instruction, the loop may be rewritten as set forth in Code Segment 7, below:

| Code Segment 7 | | | |
| --- | --- | --- | --- |
| load | v3,&b[0] | | # loads b[0]..b[15] into SIMD v0;<br># done once per filter |
| set | ac0 := 0 | | # sum = 0, first time |
| L1: | | | |
| L0: | | | |
| load | v0,&a[16*k+j] | | # SIMD load starting at a[16*k+j] |
| rmulreds | ac0,v0,v3 | | # the entire inner loop |
| rshift0 | v4,ac0,0 | | # shift upper 16 bits of ac0 into v4 |
| loop | j,16,L0 | | # do this 16 times |
| store | v4,&z[16*k] | | # 16 accumulates are stored<br># into z[16*k] at once |
| loop | k,M/16,L1 | | |

Comparing Code Segment 7 with Code Segment 3, it is noted that the loop has been broken into two parts, with the inner loop executing 16 times, and the outer loop executing M/16 times or so. This permits a shift of 16 values from the accumulator into a SIMD register and storage of the values within the same loop. By shifting and storing the values within the same loop, power may be conserved.

II. Rotation

Another possible way to conserve power is to use a variation of the shift mechanism described. In this variation, selected values of the loads between iterations may be reused. The reuse pattern is incorporated into the filter. Specifically, it is contemplated to shift the value left by 1, together with instructions to fill the undefined value with the next element from the input array, a. As discussed more fully below, this variation is referred to as a "rotation" for purposes of this disclosure.

For the invention, it is contemplated to combine shifting and loading of values together in a single instruction set. For example, it is contemplated to shift a value from a target register and also to input (or to load) a single 16-bit element from memory into the target register.

In connection with this approach, a more efficient mechanism is to move (or shift in) a value from another register into the target register and shift the value from the target register to one other register as well. Following this logic, the instruction set may be written as shown in Code Segment 8, below:

| Code Segment 8 |
| --- |
| for( j = 0; j < 15; j++ ) {<br>   v0[j] = v0[j+1];<br>}<br>v0[15] = v1[0];<br>for( j = 0; j < 15; j++ ) {<br>   v1[j] = v1[j+1];<br>} |

While this approach is entirely sound from a theoretical standpoint, the implementation of this approach in hardware presents a number of challenges. Specifically, the semantics of Code Segment 8 require communicating a value from the last value in the register file to the first value in the register file. From a circuit standpoint, this requires the use of long communication leads or wires extending from the last value to the first value in the register file. Long circuit leads have a tendency to delay processing, consume additional power, and increase manufacturing costs, at least in some instances. Therefore, it is prudent to avoid such leads, where possible.

Accordingly, to avoid this engineering challenge, one alternative approach is to link the two registers using a left shift operation in combination with a right shift operation. An example of this approach is embodied in Code Segment 9, which is provided below:

| Code Segment 9 |
| --- |
| for( j = 0; j < 15; j++ ) {<br>   v0[j] = v0[j+1];<br>}<br>v0[15] = v1[15];<br>for( j = 15; j > 0; j-- ) {<br>   v1[j+1] = v1[j];<br>} |

If the semantics presented in Code Segment 9 are employed, elements line up. Of course, as may be appreciated by those skilled in the art, there remains an undefined element, v1[0]. To address this element, v1[0] may be filled with a value such as v0[0]. This approach is outlined in Code Segment 10, which is provided below:

| Code Segment 10 |
| --- |
| t = v0[0];<br>for( j = 0; j < 15; j++ ) {<br>   v0[j] = v0[j+1];<br>}<br>v0[15] = v1[15];<br>for( j = 15; j > 0; j-- ) {<br>   v1[j+1] = v1[j];<br>}<br>v1[0] = t; |

For the invention, this paired shift in a SIMD register is referred to as "rotation." Specifically, the paired shift rotates the elements of a pair of SIMD registers.

To use rotation effectively, it is prudent to load SIMD registers in reverse, so that the element at the lowest memory position are directed to the last element instead of the first element. When a load reversed instruction is used, the instruction set for the loop may be written as presented in Code Segment 11, below:

| Code Segment 11 | | |
|---|---|---|
| load | v3,&b[0] | # loads b[0] . . . b[15] into SIMD v0;<br># done once per filter |
| set | ac0 := 0 | # sum = 0, first time |
| load | v0,&a[0] | # first load |
| L1: | | |
| loadrev | v1,&a[16*k+16] | # SIMD load in reverse order |
| L0: | | |
| rmulreds | ac0,v0,v3 | # the entire inner loop |
| rshift0 | v4,ac0,0 | # shift upper 16 bits of ac0 into v4 |
| rrot | v0,v1,1 | # rotate the pair v0,v1 by 1 |
| loop | j,16,L0 | # do this 16 times |
| store | v4,&z[16*k] | # 16 accumulates are stored<br># into z[16*k] at once |
| loop | k,M/16,L1 | |

III. Further Details of the Invention

One embodiment of the invention takes into account the discussion of the shift and rotate features described above and incorporates further modifications to these features. Specifically, in one embodiment, the invention restricts shift direction by register. In this embodiment, even registers may only be left-shifted and odd registers may only be right-shifted.

As a preliminary matter, in this embodiment of the invention, the details of which are discussed in greater detail below, v0 and v3 each may hold sixteen 16-bit values. Of course, as should be appreciated by those skilled in the art, larger or smaller bit values may be employed without departing from the scope of the invention.

In addition, for purposes of this embodiment of the invention, the SIMD register shift instruction is referred to as "rshift." The rshift instruction is the same as Code Segment 6, which is provided above.

Furthermore, as discussed above, as incorporated in Code Segment 3, the rmulreds instruction is responsible for processing the entire inner loop of the filter in one instruction. It was also discussed that, with Code Segment 3, a single iteration of the outer loop requires five instructions. On this embodiment of the invention, which may issue three instructions per cycle, the overhead would reduce the peak performance by one half.

In addition, in this embodiment, rotations are restricted to adjacent registers, so that v0 may only be rotated with v1, v2 may only be rotated with v3, etc. The instruction set that performs this function in this embodiment is referred to as the rrot instruction. For this embodiment, the rrot register specifies only one register-name to identify the pair. Thus, rrot v0,v1,1 is written as rrot v0,1.

This embodiment of the invention permits shifts and/or rotates by 1, 2, or 4. As may be appreciated, certain algorithms lend themselves to different shifts. For instance, complex reductions involve pairs of quantities, real and imaginary. Accordingly, these pairs of quantities naturally are suited to a shift/reduce by 2. Decimating filters are still employed to provide or effectuate a shift by 1. However, the rotate is 2/4 for decimate by 2/4.

During a shift by 1/2/4, the 16/32/64 bits are selected from the accumulator. This selection is controlled by an immediate field in the instruction.

Similarly, during a rotate by 1/2/4, the way the 2/4 elements are rotated into target locations is controlled by an immediate field.

It is also contemplated that some instruction sets will combine the shift and rotate behavior, possibly with some other operation, function, or calculation. In particular, the rmulreds1r instruction shifts the accumulator and clears it before doing the multiply and sum and then rotates its first argument. If written in the assembly code, therefore, the entire inner loop may be replaced by Code Segment 12, which is reproduced below:

| Code Segment 12 |
|---|
| L0: |
|     rmulreds1r v4,ac0,v0,v3 |
|     loop    j,16,L0 |

With the instruction provided by Code Segment 12, a filter may be written so that it may sustain 17 cycles to execute 16 rmulreds1 r instructions. This encompasses about 15 multiplies (or multiplications) per cycle.

Figure 2:
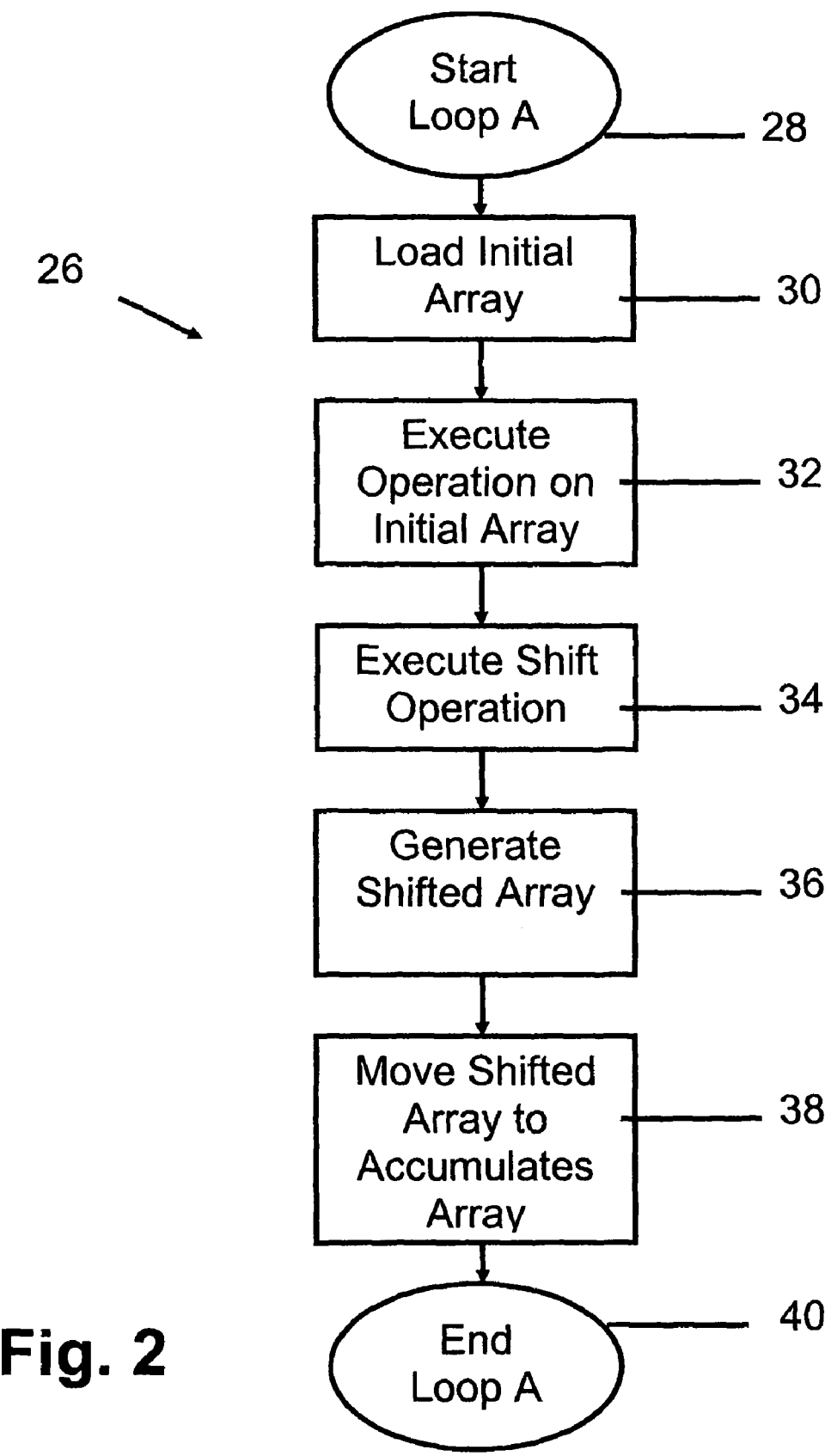
FIG. 2 is a flow diagram illustrating a flow logic for loop A from FIG. 1.
Figure 3:
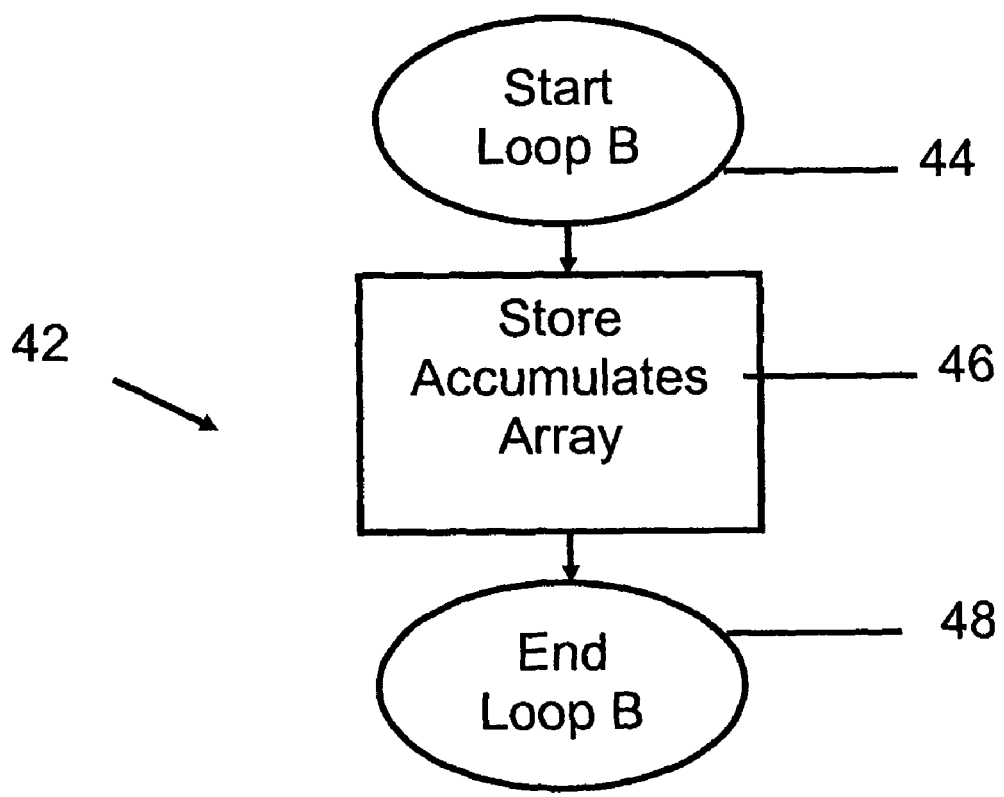
FIG. 3 is a flow diagram illustrating a flow logic for loop B from FIG. 1.
Figure 4:
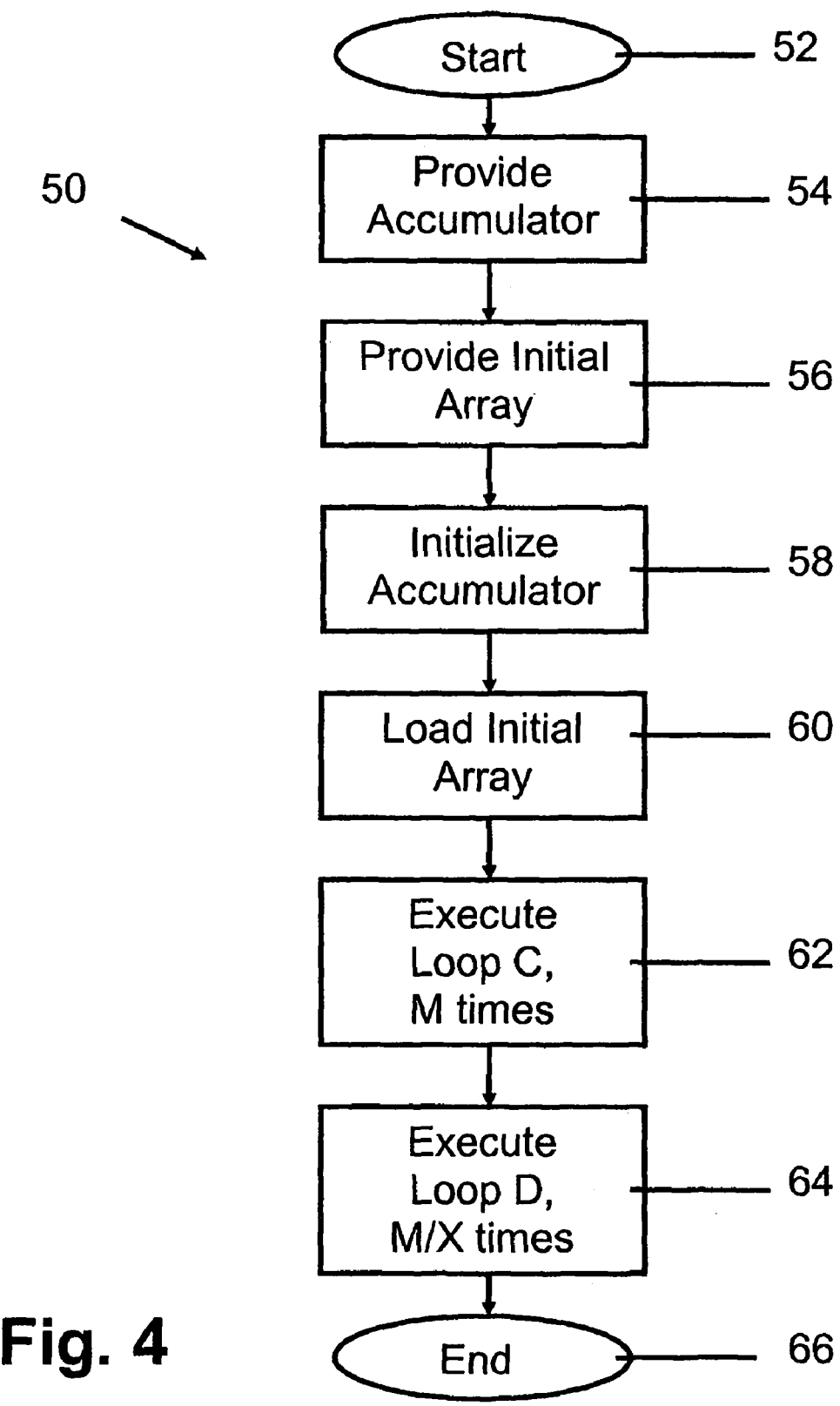
FIG. 4 is a flow diagram illustrating another embodiment of the invention.
Figure 5:
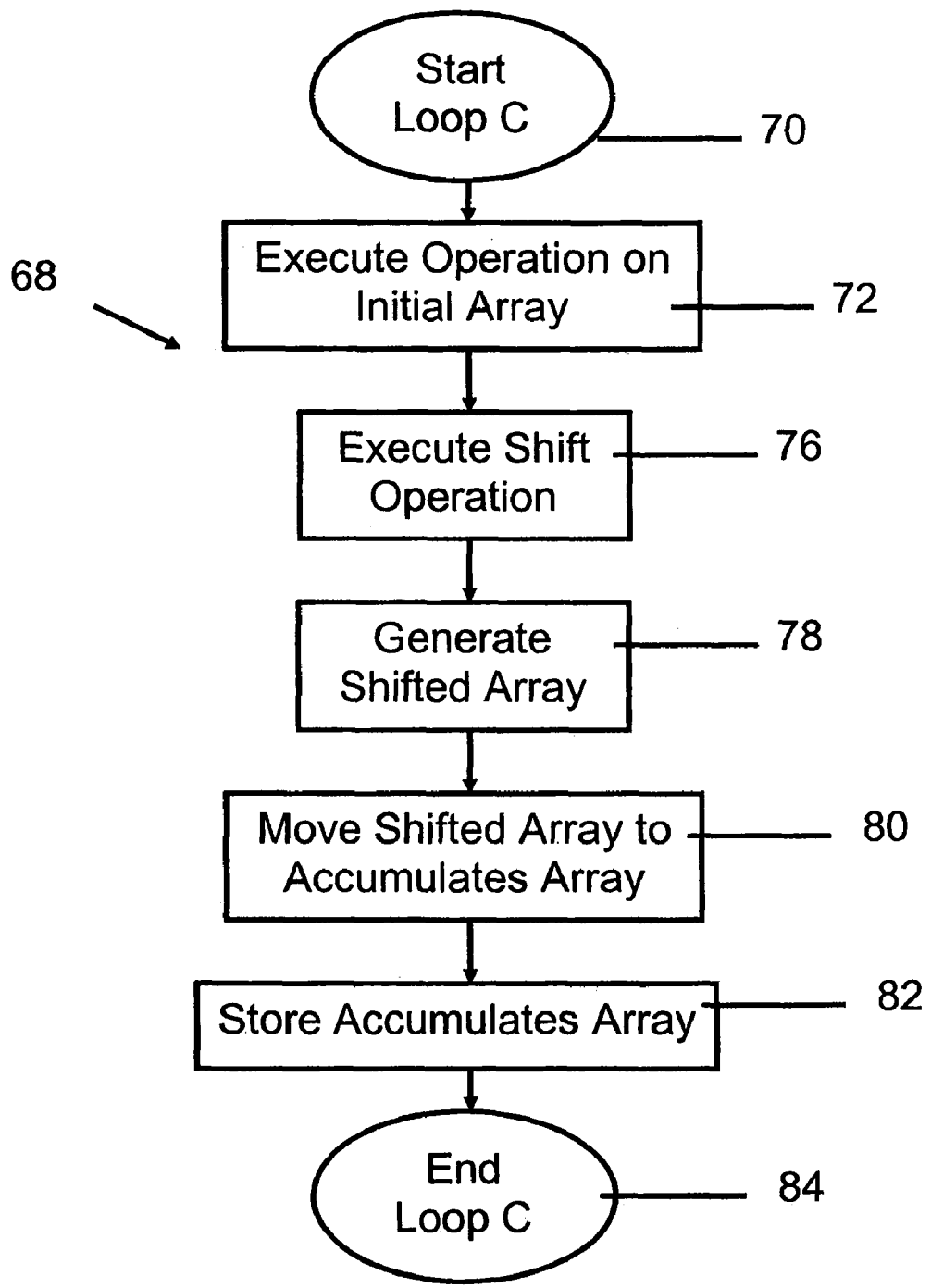
FIG. 5 is a flow diagram illustrating a flow logic for loop C from FIG. 4.
Figure 6:
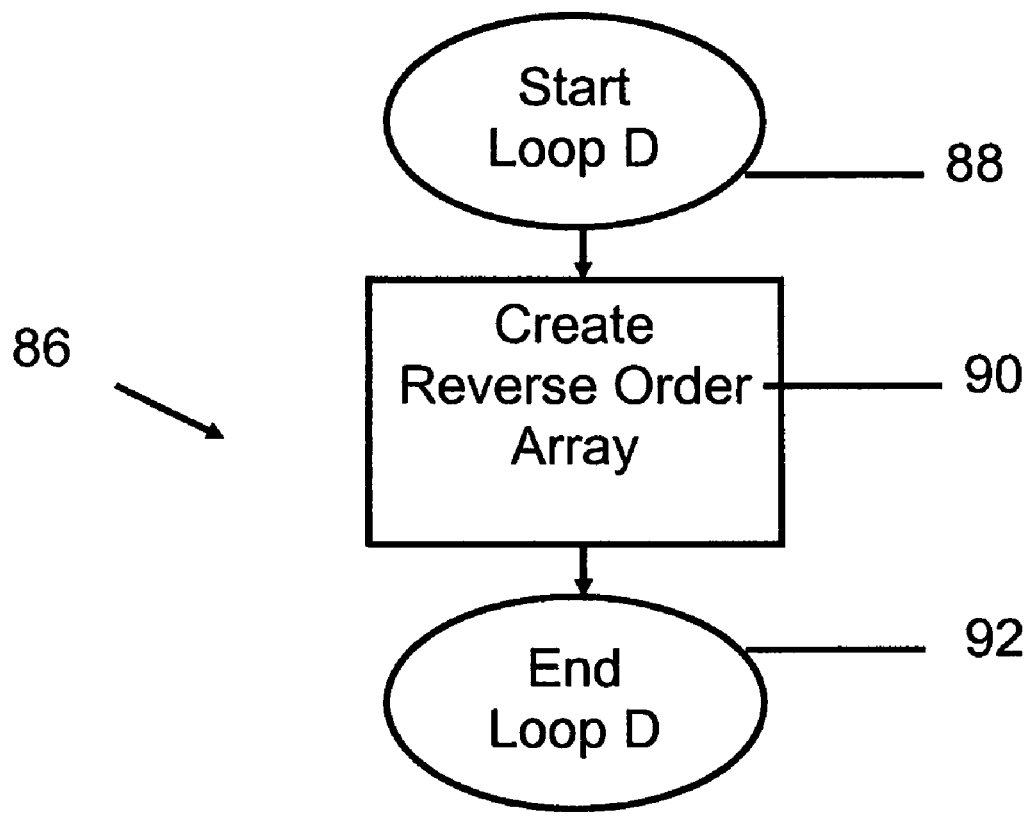
FIG. 6 is a flow diagram illustrating a flow logic for loop D from FIG. 4.

With the foregoing having been described, the invention will now be discussed in connection with the drawings appended hereto. FIGS. 1-3 refer to aspects of the instruction set outlined by Code Segment 7. FIGS. 4-6 refer to aspects of the instruction set outlined by Code Segment 11.

FIG. 1 provides a flow chart of the basic logic implemented by Code Segment 7. The basic instruction 10 begins at start 12, followed by providing an accumulator that stores the result of an operation at 14. From 14, the method proceeds to the step of providing an initial array comprising a plurality of elements at 16. From 16, the method proceeds to the step of initializing the accumulator at 18. From 18, the method proceeds to execution of a first loop A at 20, which is detailed in FIG. 2. Loop A is executed M times. From 20, the method proceeds to the execution of loop B at 22, which is detailed in FIG. 3. Loop B is executed M/X times. While X may be any number, it is expected to be a number less than or equal to M. After execution of loop B at 22, the method ends at 24.

FIG. 2 provides a basic flow chart for the method executed in loop A, which is referred to as 26. Loop A starts at 28, followed by loading of data into the elements of the initial array at 30. After 30, the method proceeds to execution of an operation on the data in the elements in the initial array to produce a resulting array at 32. The elements in the resulting array are positioned in initial locations within the resulting array. Following 32, the method proceeds to executing a shift operation on the resulting array to shift the elements at least one array location to the left or to the right from the initial locations at 34. As discussed above, this shift may be two or more locations, depending upon the requirements executing the instruction set 10. From 34, the method of loop A 26 proceeds to generating a shifted array of the elements at 36. Once the shifted array of elements is generated, the method proceeds to 38 where the shifted array is moved to an accumulates array. Loop A 26 then ends at 40.

FIG. 3 provides a basic flow chart for the method executed in loop B, which is referred to as 42. Loop B starts at 44. Loop B then proceeds to storing the accumulates array at 46. After 46, loop B ends at 46.

FIG. 4 provides a flow chart of the basic logic implemented by Code Segment 11. The basic instruction 50 begins at start 52, followed by providing an accumulator that stores the result of an operation at 54. From 54, the method proceeds to the step of providing an initial array comprising a plurality of elements at 56. From 56, the method proceeds to the step of initializing the accumulator at 58. From 58, the method proceeds to loading of data into the elements of an initial array at 60. From 60, the method proceeds to execution of a first loop C at 62, which is detailed in FIG. 5. Loop C is executed M times. From 62, the method proceeds to the execution of loop D at 64, which is detailed in FIG. 6. Loop D is executed M/X times. While X may be any number, it is expected to be a number less than or equal to M. After execution of loop D at 64, the method ends at 66.

FIG. 5 provides a basic flow chart for the method executed in loop C, which is referred to as 68. Loop C starts at 70, followed by execution of an operation on the data in the elements in the initial array to produce a resulting array at 72. The elements in the resulting array are positioned in initial locations within the resulting array. Following 72, the method proceeds to executing a shift operation on the resulting array to shift the elements at least one array location to the left or to the right from the initial locations at 76. As discussed above, this shift may be two or more locations, depending upon the requirements executing the instruction set 50. From 76, the method of loop C proceeds to generating a shifted array of the elements at 78. Once the shifted array of elements is generated, the method proceeds to 80 where the shifted array is moved to an accumulates array. The accumulates array is then stored at 82. Loop C 68 then ends at 84.

FIG. 6 provides a basic flow chart for the method executed in loop D, which is referred to as 86. Loop D starts at 88. Loop B then proceeds to loading, in reverse order, the data from the elements in the initial array to create a reverse order array at 90. After 90, loop D ends at 92.

Figure 7:
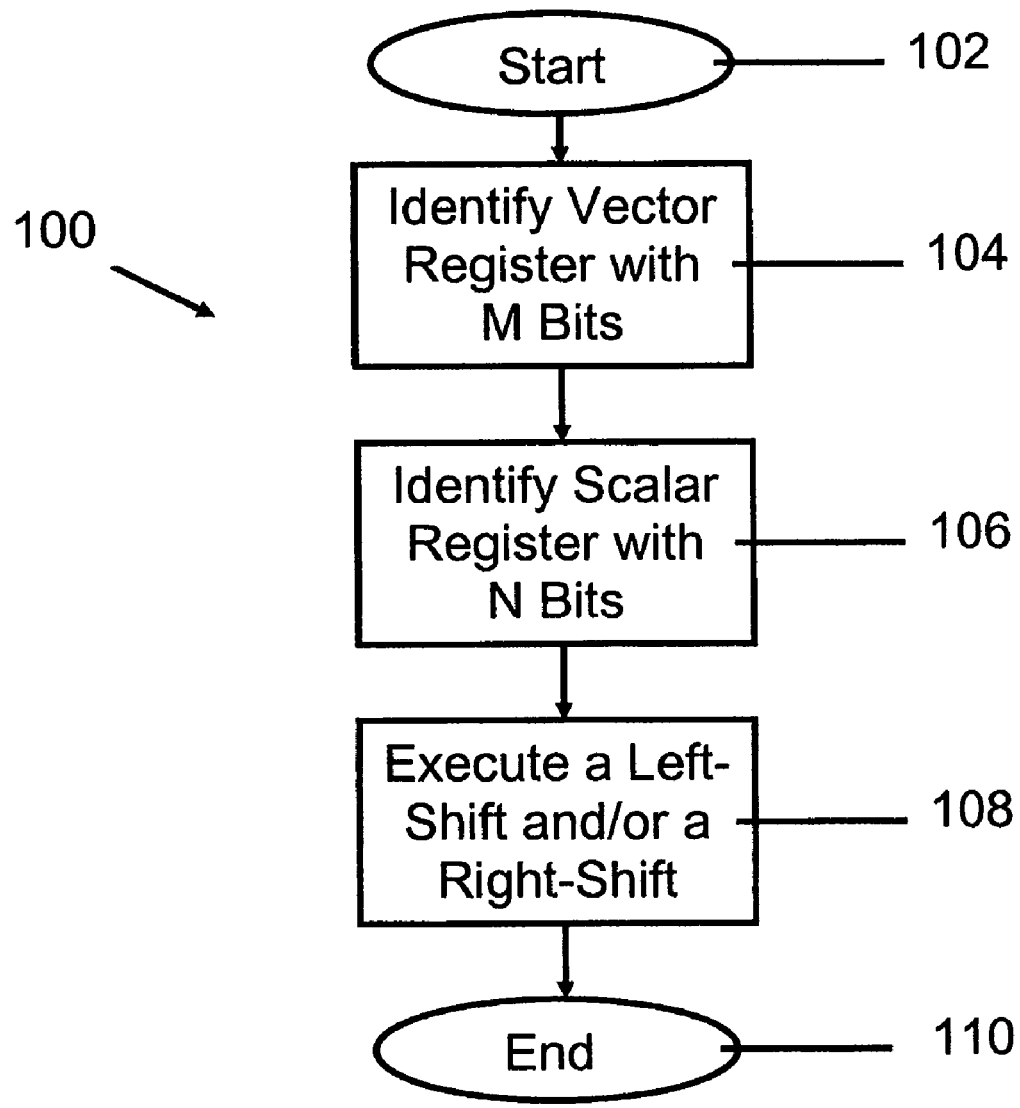
FIG. 7 is a flow diagram of one contemplated embodiment of a shift operation according to the invention.

FIG. 7 provides a flow diagram for a further embodiment contemplated by the present invention. This embodiment illustrates at least one definition of "shifting," as used in connection with the invention.

In FIG. 7, the process 100 begins at start 102. After the start 102, the process proceeds to 104 where one or more first registers with M bits are identified. After 104, the process proceeds to 106 where one or more second registers with N bits are identified. It is noted that "identifying" may include locating, calculating, or generating the registers. In other words, "identifying" is intended to broadly encompass retrieval of the registers from memory or creation of the registers by calculation, processing, or other methods.

After 106, the process proceeds to 108 where either a left shift or a right shift is executed. Alternatively, both a left shift and a right shift may be employed. Generically, the shift includes shifting K bits, where K≦N, from the second register into the first register. Specifically, the shift may be either a left shift 112, which is described in connection with FIG. 8 or a right shift 126, which is described in connection with FIG. 9.

Figure 8:
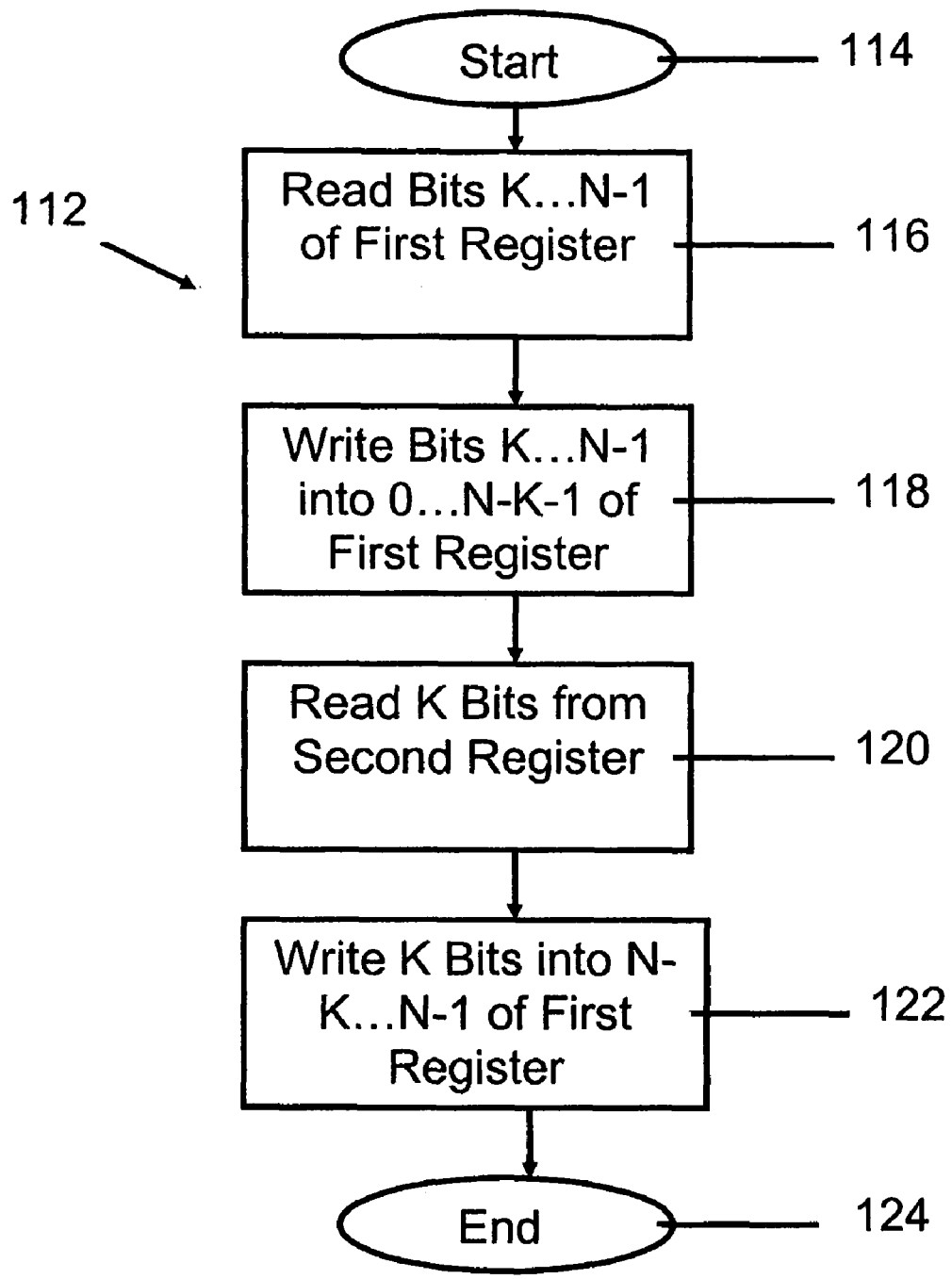
FIG. 8 is a flow diagram of a left shift operation according to the invention.

For a left shift operation 112, as detailed in FIG. 8, the shift operation begins at a start 114. Following the start 114, the left shift proceeds to 116 where bits K . . . N−1, including selected contents of the first register, are read. Then, at 118, the bits K . . . N−1 are written into bit positions 0 . . . N−K−1 of the first register. At 120, the K bits from the second register are read. At 122, the K bits from second register are written into bit positions N−K . . . N−1 of first register. The left shift operation 112 ends at 124.

Figure 9:
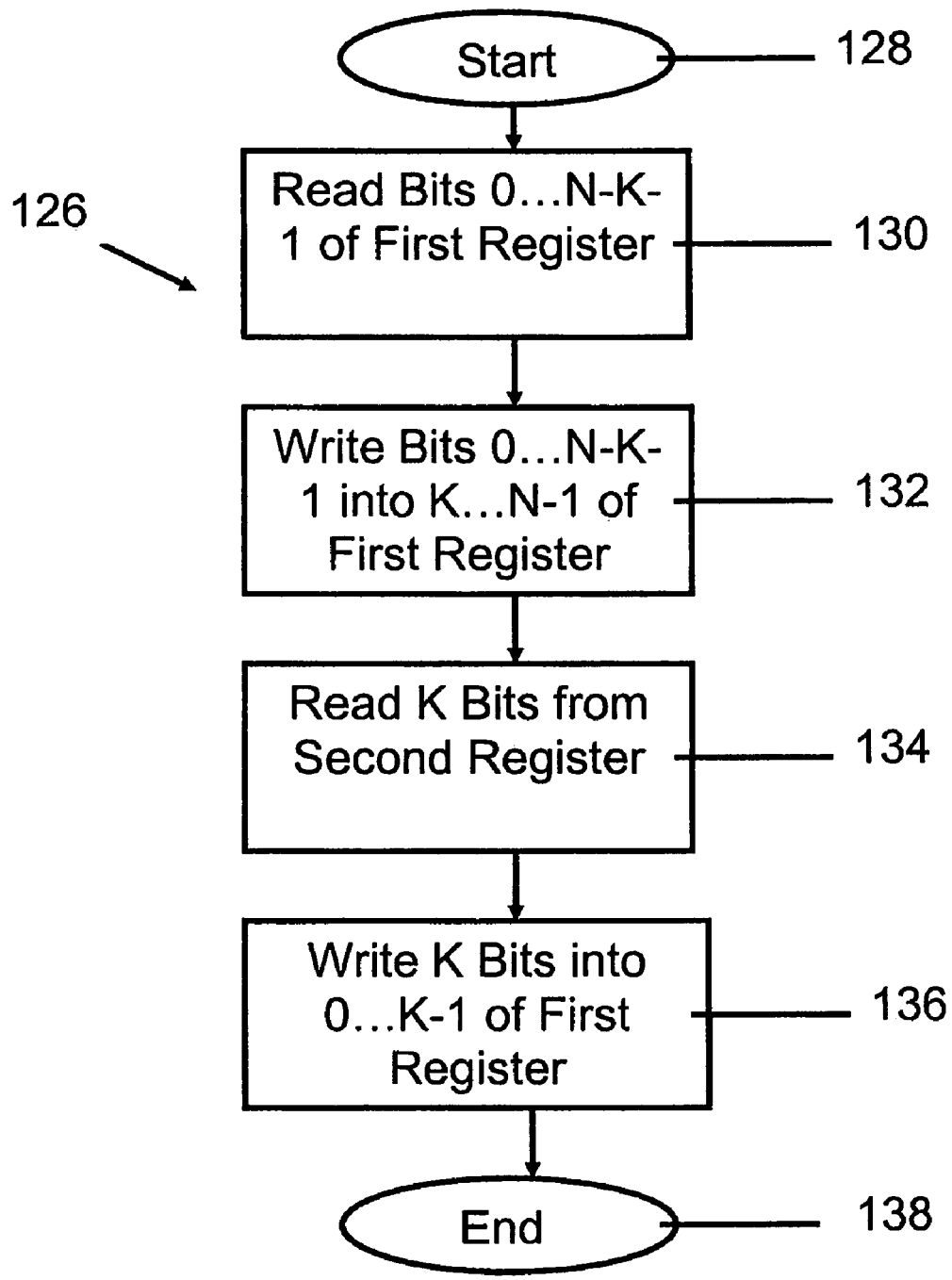
FIG. 9 is a flow diagram of a right shift operation according to the invention.

A right shift operation 126 is described in connection with FIG. 9. The right shift 126 begins at 128. After the start 128, the right shift operation 126 proceeds to 130, where bits 0 . . . N−K−1, including selected contents of the first register, are read. The right shift operation 126 then proceeds to 132, where the bits 0 . . . N−K−1 are written into bit positions K . . . N−1 of the first register. Following 132, the K bits are read from the second register at 134. Then, at 136, the K bits from second register are written into bit positions 0 . . . K−1 of first register. The right shift operation 126 ends at 138.

In connection with this discussion of left and right shifting, it is noted that shifting may also include a reducing operation.

A reducing operation is one where the contents from a plurality of the first registers are read and then the K bits are written to a single scalar register. In other words, the input for the operation may be derived from a plurality of registers rather than a single register.

In connection with the shifting operation, it is also contemplated that the contents of the second register may be set to 0 after the K bits are written from the second register into the first register. This operation also may be incorporated into the reducing operation, as should be appreciated by those skilled in the art.

It is contemplated that the value for K may be any factor of 2, since the operation of the methods described herein are performed in a binary environment. Accordingly, while a basic principle, the value for K is contemplated to be a value expressed as $2^b$ bits, where b is an integer. Since most processors today operate using a 16 bit standard, the value of b=4. As should be appreciated by those skilled in the art, however, the invention is not limited to a 16 bit environment. It may be employed in a 32 bit (b=5), 64 bit (b=6), 128 bit (b=7), or larger environment. With this in mind, it is contemplated that the most common processing environments will include 16 bit, 32 bit, and 64 bit processing.

In connection with the reading functions discussed in connection with the left and right shifts, the K bits may be read from different positions in the second register according to a predetermined function. In other words, while series of adjacent bits are likely to be processed in the manner discussed herein, there is no limitation as to the particular order of the read function. Any suitable function may act as an overlay without departing from the scope of the invention, as should be appreciated by those skilled in the art. In addition, the function that determines the positions from which the K bits are read also may be employed to determine the value of K.

As may be appreciated by those skilled in the art, the first register may be a vector register and the second register may be a scalar register. Other variations also may be employed without departing from the scope of the invention.

Figure 10:
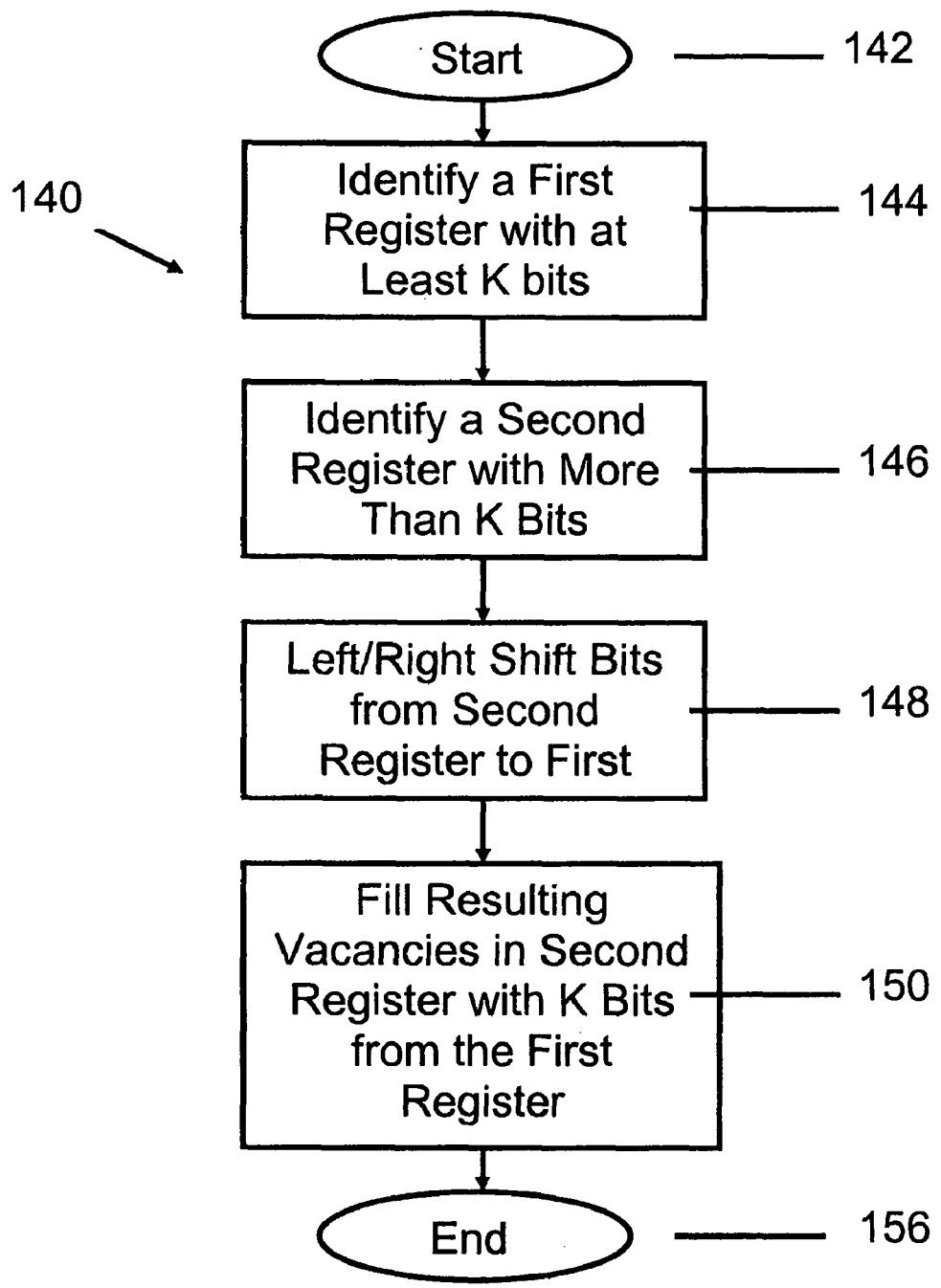
FIG. 10 is a flow diagram of another shift operation according to the invention.

FIG. 10 provides a flow diagram for yet another embodiment contemplated by the present invention. This embodiment illustrates at least one other embodiment of a shift operation in connection with the invention.

With reference to FIG. 10, the shift operation 140 begins at start 142. Following this, the shift operation 140 proceeds to 142, where at least one first register containing at least K bits is identified. Then, at 146, at least one second register defining storage locations for more than the K bits is identified. At 148, the K bits from the first register are read and the K bits are written to the second register, thereby shifting the K bits, wherein contents of the second register are at least one of left-shifted or right-shifted, by K bits, with respect to contents of the first register. At 150, any resulting vacancy in the second register is filled with the K bits from the first register. The shift operation 140 ends at 156.

With continued reference to the shift operation 140, it is contemplated that the first register will be at least one pair of first registers, and the second register will be least one pair of second registers. In this variation, shifting causes the K bits to be read from the pair of first registers and written to the pair of second registers. The contents of the pair of second registers are at least left-shifted or right-shifted, by K bits, with respect to contents of the pair of first registers. As noted above, resulting vacancies in the pair of second registers are filled by the K bits from the pair of first registers.

In connection with this embodiment, it is contemplated that the contents of one of the pair of second registers is left-shifted while the contents of the other of the pair of second registers is right-shifted. While this embodiment contemplates solely the use of paired registers, it is contemplated that at least one register may be paired neither with the first pair of registers nor the second pair of registers. As noted, all of the registers may be pairs of registers, thereby aligning all of the pairs of first registers with all of the pairs of second registers.

Additionally, it is contemplated that the operation will include a function or instruction set where selection of whether the contents of the pair of second registers are left-shifted or right-shifted is predetermined. In this variation, the pair of second registers includes a left shift second register and a right shift second register. The left shift second register and the right shift second register each pair with complimentary ones of the pair of first registers. As with the previous embodiment, a value of K is determined by the operation as are the locations within the second register where contents from the first register are written.

In one other contemplated variation, when determining the value of K, control over any calculations executed in connection with the shifting may also be provided. In this regard, there may be functional or calculational overlays incorporated into the operation to alter characteristics of the shifting operation. It is contemplated that this may alter the locations within the second pair of registers where contents from the first pair of registers are written.

Figure 11:
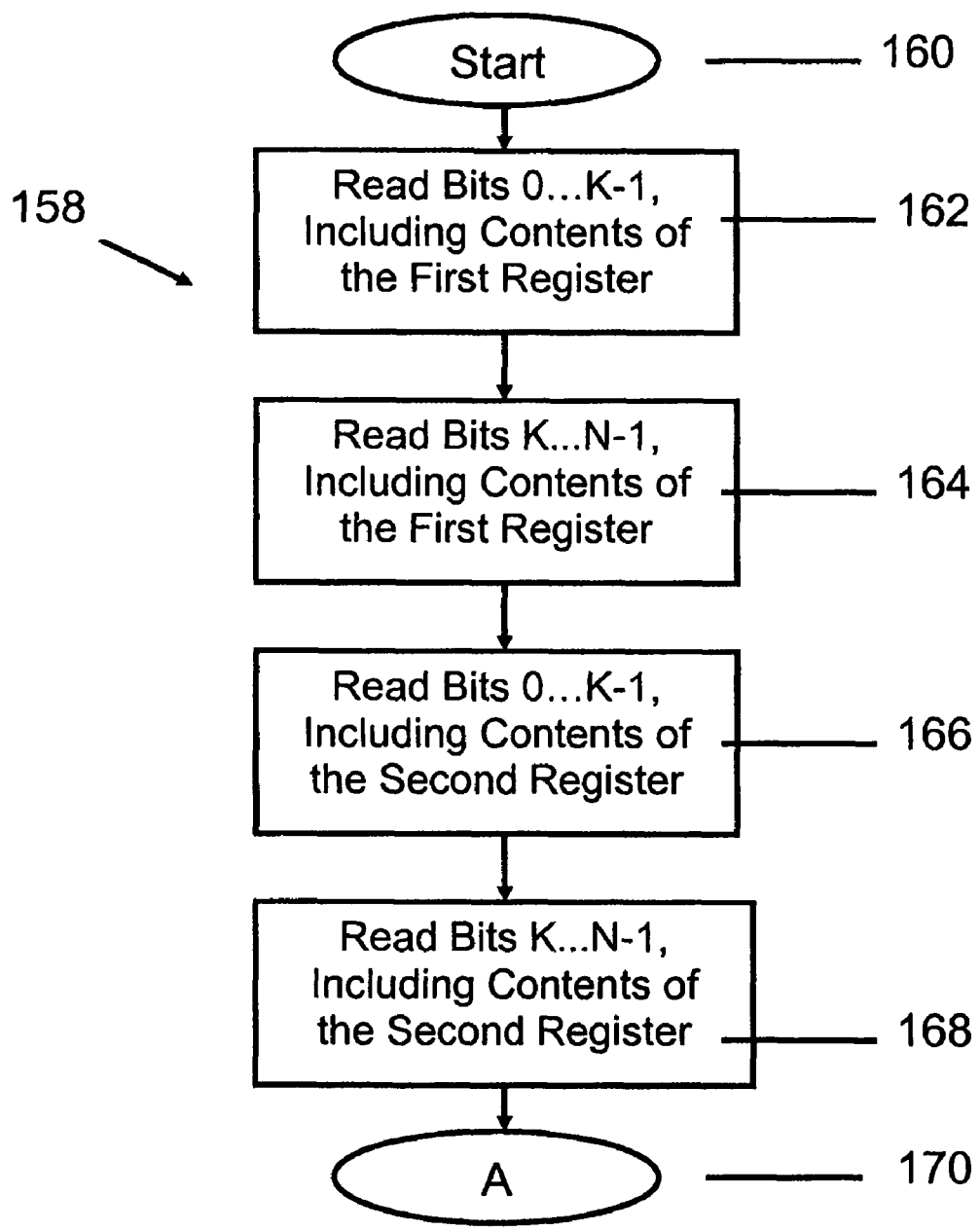
FIG. 11 is a first part of a flow diagram of a rotate operation according to the invention.
Figure 12:
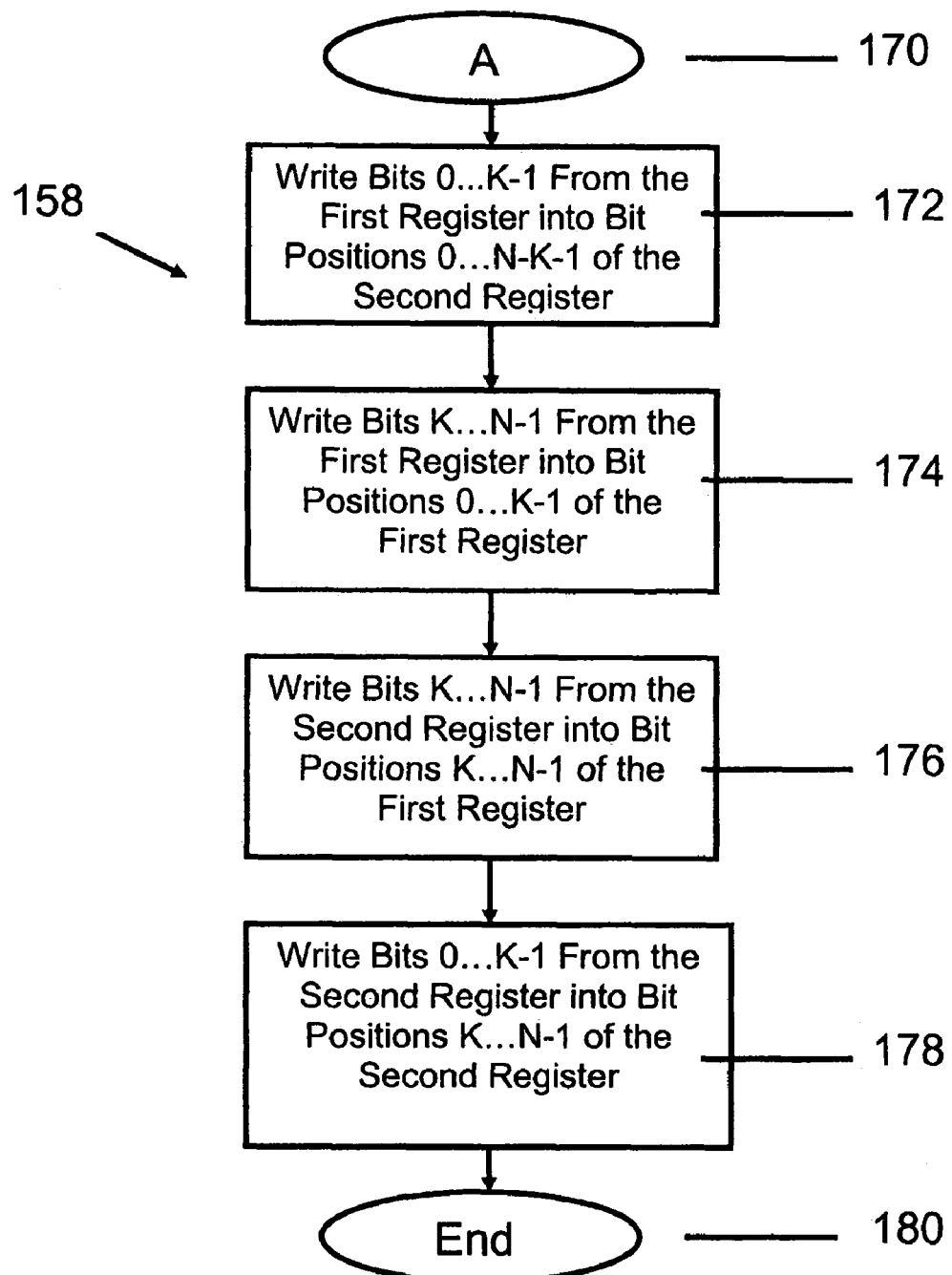
FIG. 12 is a second part of the flow diagram, continued from FIG. 11, of a rotate operation according to the invention.

Reference is now made to FIGS. 11 and 12, which collectively provide a flow diagram of a rotate operation 158 according to the invention.

To provide a preliminary understanding of the rotate operation 158, the following basics are provided. For a rotate operation 158, there are at least two registers, a first register and a second register. For simplicity, both registers include N bits from $0 \ldots N-1$. In addition, $K \leq N$. The bits in a register may be divided into two groups (1) bits $0 \ldots K-1$, and (2) bits $K \ldots N-1$. An initial set-up of two registers appears as shown in Table 1:

TABLE 1

|  |  |  |
|---|---|---|
| Register 1 | X | Y |
| Register 2 | A | B |

X an B refer to bits $0 \ldots K-1$, while Y and A refer to bits $K \ldots N-1$. After a rotation is concluded, the registers will appear as shown in Table 2:

TABLE 2

|  |  |  |
|---|---|---|
| Register 1 | Y | B |
| Register 2 | X | A |

As should be appreciated, this is a single rotation. A double rotation is shown in Table 3 and a triple rotation is provided by Table 4.

TABLE 3

|  |  |  |
|---|---|---|
| Register 1 | B | A |
| Register 2 | Y | X |

TABLE 4

|  |  |  |
|---|---|---|
| Register 1 | A | X |
| Register 2 | B | Y |

As should be appreciated a quadruple rotation would bring the initial set up back to the original condition.

Returning to FIGS. 11 and 12, the rotate operation 158 begins at 160. In connection with the discussion of this operation, it is noted that first and second registers will be identified. Since these steps are discussed above, they are not included in FIG. 11 or 12. However, at least a first register and a second register are identified in connection with the execution of the rotate operation 158.

At 162, bits $0 \ldots K-1$ are read. Bits $0 \ldots K-1$ encompass a portion of the contents of the first register. At 164, bits $K \ldots N-1$ are read. Bits $K \ldots N-1$ also encompass a portion of the contents of the first register. At 166, bits $0 \ldots K-1$, are read. Bits $0 \ldots K-1$ encompass a portion of the second register. At 168, bits $K \ldots N-1$ are read. Bits $K \ldots N-1$ also encompass at least a portion of the second register. The process 158 transitions to the write portion at 170.

As noted, a rotation may be a single, double, or triple rotation. For a single rotation, which is illustrated in FIG. 12, at 172, bits $0 \ldots K-1$ are written from the first register into bit positions $0 \ldots K-1$ of the second register. At 174, the bits $K \ldots N-1$ are written from the first register into bit positions $0 \ldots K-1$ of the first register. At 176, the bits $K \ldots N-1$ are written from the second register into bit positions $K \ldots N-1$ of the first register. At 178, the bits $0 \ldots K-1$ are written from the second register into bit positions $K \ldots N-1$ of the second register. The single rotation process 158 concludes at 180.

To effectuate a double shift, the bits $0 \ldots K-1$ are written from the first register into bit positions $K \ldots N-1$ of the second register, the bits $K \ldots N-1$ are written from the first register into bit positions $0 \ldots K-1$ of the second register, the bits $K \ldots N-1$ are written from the second register into bit positions $0 \ldots K-1$ of the first register, and the bits $0 \ldots K-1$ are written from the second register into bit positions $K \ldots N-1$ of the first register. For a triple rotation, the bits $0 \ldots K-1$ are written from the first register into bit positions $K \ldots N-1$ of the first register, the bits $K \ldots N-1$ are written from the first register into bit positions $K \ldots N-1$ of the second register, the bits $K \ldots N-1$ are written from the second register into bit positions $0 \ldots K-1$ of the second register, and the bits $0 \ldots K-1$ are written from the second register into bit positions $0 \ldots K-1$ of the first register.

As should be appreciated, not all of these different rotations will be available for different ones of the first and second registers. For example, if N>>K, the rotation may result in too many bits being shifted to a particular register. This operation would not result in a useful result and, therefore, would not typically be effectuated.

As also should be apparent, FIGS. 11 and 12 illustrate a counter-clockwise rotation. A clockwise rotation also is contemplated to fall within the scope of the invention. Clearly, whether the rotation is clockwise or counter-clockwise, the same permutations on register contents, as provided in Tables 1-4, may be created, albeit in a different sequence.

As may be appreciated from the foregoing, shift and rotate functions may be combined, gaining additional processing advantages that are also within the scope of the invention.

In one contemplated example of the invention, the method includes a rotation operation 158 combined together with one or more shift operations. When a rotation operation 158 is combined with a shift operation, the shift operation is performed on a distinct set of first and second registers. In other words, the shift operation is performed on different ones of the first and second registers than the rotate operation. For clarity, the "other" first and second registers may be referred to as third and fourth registers.

With this in mind, a shift operation may be performed in parallel with the rotate operation according to the following. K bits, where K≦N, may be shifted from at least one fourth register into at least one third register. In this shift operation, the K bits are shifted according to at least one of a left shift operation or a right shift operation.

For a left shift operation, bits K . . . N−1 are read. These bits include selected contents of the third register. Then, bits K . . . N−1 are written into bit positions 0 . . . N−K−1 of the third register. Following this, the K bits from the fourth register are read, and the K bits from the fourth register are written into bit positions N−K . . . N−1 of the third register.

For a right shift operation, bits 0 . . . N−K−1 are read. These bits include selected contents of the third register. Then, bits 0 . . . N−K−1 are written into bit position K . . . N−1 of the third register. Next, the K bits from the fourth register are read. Finally, the K bits from the fourth register are written into bit positions 0 . . . K−1 of the third register.

As before, it is contemplated that any resulting vacancies in the third register may be filled the K bits from the fourth register. The shifting and rotating functions may be performed simultaneously. As before, control may be provided over any calculations executed in connection with at least one of either left shifting or right shifting.

The present invention is not intended to be limited solely to the embodiments described herein. To the contrary, the invention is intended to encompass any equivalents thereto, as would be appreciated by those skilled in the art, as presently developed or as developed in the future.

What is claimed is:

1. A processing method for rotating elements of a pair of registers, comprising:
   identifying at least one first register with M bits, the first register being a vector register;
   identifying at least one second register with N bits, the second register being a scalar register;
   shifting K bits, where K is less than N, from the second register into the first register, wherein the K bits are shifted according to at least one of:
   (1) executing a left shift comprising:
      reading N−K bits starting at bit position K of the first register, comprising selected contents of the first register,
      writing the bits read into bit positions of the first register starting at bit position 0,
      reading the K bits from the second register, and
      writing the K bits read from the second register into bit positions of the first register starting at bit position N−K, or
   (2) executing a right shift comprising:
      reading N−K bits starting at bit position 0 of the first register, comprising selected contents of the first register,
      writing the bits read into bit positions of the first register starting at bit position K,
      reading the K bits from the second register, and
      writing the K bits read from the second register into bit positions of the first register starting at bit position 0.

2. The method of claim 1, wherein the shifting further comprises:
   setting the contents of the second register to 0 after writing the K bits from the second register into the first register.

3. The method of claim 1, wherein the K bits comprise $2^b$ bits.

4. The method of claim 3, wherein b is 3, 4, 5, or 6.

5. The method of claim 4, wherein the K bits are read from different positions in the second register according to a predetermined function.

6. The method of claim 5, wherein a value of K also is determined by the predetermined function.

7. The method of claim 1, wherein only one of the left shift or the right shift is executed.

8. The method of claim 1, wherein the second register is a scalar accumulator register.

9. A processing apparatus, comprising:
   a first register with M bits, the first register being a vector register;
   a second register with N bits, the second register being a scalar register, wherein the processing apparatus is configured to shift K bits, where K is less than N, from the second register into the first register, wherein the K bits are shifted according to at least one of:
   (1) executing a left shift comprising:
      reading N−K bits starting at bit position K of the first register, comprising selected contents of the first register,
      writing the bits read into bit positions of the first register starting at bit position 0,
      reading the K bits from the second register, and
      writing the K bits read from the second register into bit positions of the first register starting at bit position N−K, or
   (2) executing a right shift comprising:
      reading N−K bits starting at bit position 0 of the first register, comprising selected contents of the first register,
      writing the bits read into bit positions of the first register starting at bit position K,
      reading the K bits from the second register, and
      writing the K bits read from the second register into bit positions of the first register starting at bit position 0.

10. The apparatus of claim 9, wherein the shifting further comprises:
    setting the contents of the second register to 0 after writing the K bits from the second register into the first register.

11. The apparatus of claim 9, wherein the K bits comprise $2^b$ bits.

12. The apparatus of claim 11, wherein b is 3, 4, 5, or 6.

13. The apparatus of claim 12, wherein the K bits are read from different positions in the second register according to a predetermined function.

14. The apparatus of claim 13, wherein a value of K also is determined by the predetermined function.

15. The apparatus of claim 9, wherein only one of the left shift or the right shift is executed.

16. The apparatus of claim 9, wherein the second register is a scalar accumulator register.

17. A processing apparatus, comprising:
    means for identifying at least one first register with M bits, the first register being a vector register;
    means for identifying at least one second register with N bits, the second register being a scalar register; and
    means for shifting K bits, where K is less than N, from the second register into the first register, wherein the K bits are shifted according to at least one of:
    (1) executing a left shift comprising:
       reading N−K bits starting at bit position K of the first register, comprising selected contents of the first register, writing the bits read into bit positions of the first register starting at bit position 0, reading the K bits from the second register, and writing the K bits read from the second register into bit positions of the first register starting at bit position N−K, or (2) executing a right shift comprising:

reading N−K bits starting at bit position 0 of the first register, comprising selected contents of the first register, writing the bits read into bit positions of the first register starting at bit position K, reading the K bits from the second register, and writing the K bits read from the second register into bit positions of the first register starting at bit position 0.

18. The apparatus of claim 17, wherein the means for shifting further comprises:

setting the contents of the second register to 0 after writing the K bits from the second register into the first register.

19. The apparatus of claim 17, wherein the K bits comprise $2^b$ bits.

20. The apparatus of claim 19, wherein b is 3, 4, 5, or 6.

21. The apparatus of claim 20, wherein the K bits are read from different positions in the second register according to a predetermined function.

22. The apparatus of claim 21, wherein a value of K also is determined by the predetermined function.

23. The apparatus of claim 22, wherein only one of the left shift or the right shift is executed.

24. The apparatus of claim 17, wherein the second register is a scalar accumulator register.

\* \* \* \* \*